June 2, 1942.   V. H. HURT   2,285,335
EMBOSSED MATERIAL AND METHOD OF MAKING THE SAME Filed April 2, 1940

INVENTOR.
VICTOR H. HURT
BY *Gourley & Buelley*
ATTORNEYS

Patented June 2, 1942

2,285,335

UNITED STATES PATENT OFFICE 2,285,335

EMBOSSED MATERIAL AND METHOD OF MAKING THE SAME

Victor H. Hurt, Cranston, R. I., assignor to United States Rubber Company, New York, N. Y., a corporation of New Jersey Application April 2, 1940, Serial No. 327,466

2 Claims. (Cl. 41—24)

This invention relates to an embossed plied material comprising an embossed rubber sheet having a non-elastic sheet adhered thereto so that the embossed properties of the rubber sheet are imparted to the non-elastic sheet, and method of making the same.

The term "rubber" in the specification and claims, unless otherwise modified, is intended to include natural rubber, synthetic rubbers, rubber substitutes and the like.

It is relatively a simple matter to emboss sheet material having sufficient inherent stiffness to retain its embossed properties. For example it is not difficult to emboss relatively thick paper or cardboard by molding the same into the desired shape while it is in a wet condition. When, however, the sheet material does not possess sufficient inherent stiffness to remain in the embossed condition a much more difficult problem is presented.

It has been proposed heretofore to impart embossed or puckered properties to a non-elastic material by securing thereto an elastic thread under sufficient tension to cause the thread to contract and pucker the sheet material when the latter is free from tension. Fabrics and thin sheet leather have had puckered and elastic property imparted thereto heretofore by sewing or otherwise securing elastic thread in a tensioned condition to such non-elastic sheets.

The present invention contemplates an extremely simple, inexpensive and practical method of imparting to fabrics, leather or other highly flexible sheet material puckered or embossed properties, either for the purpose of imparting ornamental properties thereto or to render such non-elastic material elastic.

In accordance with the present invention an embossed or puckered rubber sheet is provided which has sufficient inherent form-retaining properties to yieldingly impart these properties to a sheet of cloth, leather or the like when the same is adhesively secured thereto, to thereby transfer the embossed properties of the rubber sheet accurately to the non-elastic sheet.

As a result of the present invention the rubber sheet may be provided with projections at one face of any desired configuration and corresponding depressions at its opposite face, and by employing the method of the present invention the contour of these projections irrespective of their shape can be accurately imparted to the non-elastic sheet.

In carrying out the present invention it is desirable to stretch the embossed rubber sheet sufficiently to flatten out the embossed projections and then adhesively secure the non-elastic sheet to the stretched rubber sheet and to its flattened projections, and then allow the rubber sheet to contract and assume its embossed condition, to thereby impart its embossed properties to the non-elastic sheet.

The above and other features of the invention and method of carrying out the same will be more fully understood from the following description when read in connection with the accompanying drawing which illustrates one good practical embodiment of the invention.

Figure 1:
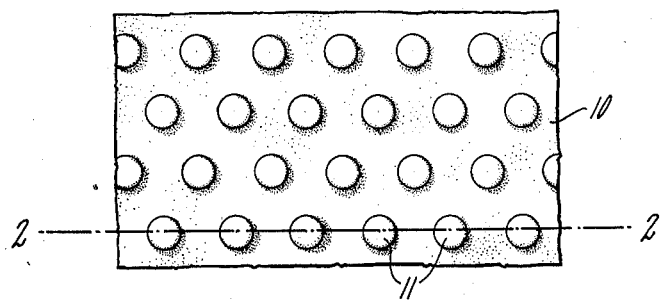
Fig. 1 is a plan view of an embossed sheet of rubber employed in carrying out the present invention.
Figure 2:
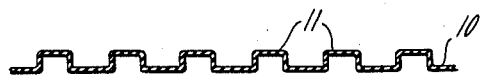
Fig. 2 is a sectional view taken on the line 2—2 of Fig. 1.

The sheet of rubber 10 is shown in Fig. 1 as formed with the spaced cup-like projections 11 which yieldingly retain their cup-like shape. While these projections are shown as being of circular contour it will be apparent that they may be given various other shapes if desired. The rubber sheet 10 is preferably formed so that it is of substantially uniform thickness throughout, as will be apparent from Fig. 2, in order that the main portion of the sheet 10 and the cup-like projections 11 will have sufficient inherent form-retaining properties to return to their normal embossed condition when free from tension, and impart these embossed properties accurately to a piece of fabric, leather or other sheet material adhesively secured thereto.

Figure 3:
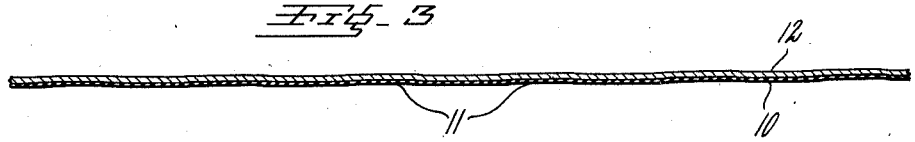
Fig. 3 is a sectional view showing the rubber sheet of Fig. 2 stretched and having a non-elastic sheet adhesively secured thereto.

In carrying out the present invention the embossed rubber sheet 10 is preferably stretched both longitudinally and transversely a substantial amount so as to temporarily flatten out these cup-like projections 11, so that the sheet while stretched will retain the projections 11 in the flat or substantially flat condition indicated at 11 in Fig. 3. While the rubber sheet is retained in this condition the non-elastic sheet 12 is adhesively secured thereto throughout the entire rubber sheet including the flattened embossed portions thereof. The sheet 12 may be a woven or knitted fabric or a sheet of thin leather or various other sheet material, provided it is sufficiently soft and flexible to permit the rubber sheet to impart its embossed properties thereto. It is apparent that if the sheet 12 is so heavy and stiff that it will not permit the rubber sheet 10 to return to its embossed condition, the desired puckered or embossed effect will not be imparted to the non-elastic sheet.

Figure 4:
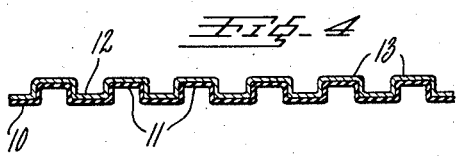
Fig. 4 is a sectional view showing the plied material of Fig. 3 in its normal relaxed condition.
Figure 5:
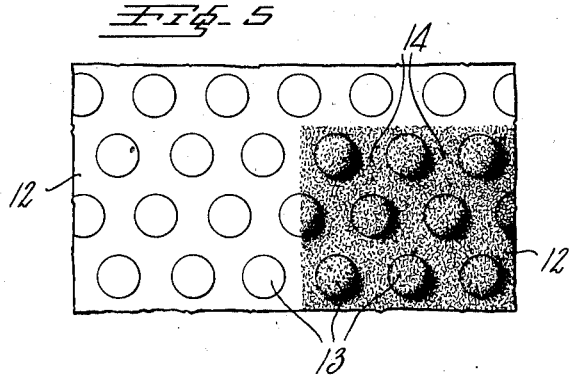
Fig. 5 is a plan view of the plied material of Fig. 4.

If, however, the sheet 12 is sufficiently light in weight and flexible to allow the rubber sheet to impart its embossed properties thereto, then when the tension upon the rubber sheet 10 is relieved in the plied construction of Fig. 3, this rubber sheet will contract as shown in Fig. 4 and impart its embossed properties to the non-elastic sheet 12 as will be apparent from Figs. 4 and 5.

The contraction of the rubber sheet 10 condenses the non-elastic sheet 12 throughout to thereby impart elastic properties thereto in addition to yieldingly holding the sheet 12 in the embossed condition.

The sheet 12 is shown in Fig. 5 as a leather sheet and it will be noted that the contraction of the rubber sheet 10 serves not only to impart to the leather sheet the cup-like projection 13, but serves also to condense the leather as indicated at 14 upon that portion of the drawing which has been provided with hair-like lines.

It will be understood that the desired embossed projections may be imparted to the rubber sheet 10, for example, by molding such rubber sheet while it is in a softened condition, then heating, vulcanizing or otherwise treating this rubber sheet to set it in this condition. The rubber sheet, however, should be sufficiently elastic to permit it to be stretched enough to flatten out the projections 11 as shown in Fig. 3, and then fully regain its embossed shape when the tension is relieved.

It will be apparent from the foregoing that any desired puckered or embossed properties may be imparted to the non-elastic sheet 12 by first imparting these properties to the rubber sheet 10, and then stretching this sheet as above described and adhesively securing the sheet 12 to this stretched sheet so that when the latter is allowed to contract it will accurately impart its embossed properties to the non-elastic sheet.

The present invention may be employed to impart a substantial range of stretch to a sheet of leather or non-elastic fabric, since the formation of the puckers increases the range of stretch. If it is desired to make the finished product pervious to air, this may be accomplished by making the rubber sheet 10 porous or pervious to air, and by employing an adhesive binder between the sheets 10 and 12 which is pervious to the air.

Embossed properties could, to a degree, be imparted to a non-elastic sheet by simply employing a rubber sheet having holes punched therein in place of the projections 11 shown in Fig. 1, but this would produce a much less satisfactory embossed result than that secured by the present invention. This is apparent since where the holes occur the non-elastic sheet would not have the shape of each projection accurately controlled as is done by employing the method of the present invention.

Non-elastic sheet material such for example as fabric, or leather may be treated in accordance with the present invention for the sole purpose of making it more ornamental in appearance. Should this be the case and the elastic properties imparted to such sheet not desirable, then such elastic properties may be easily disposed of by adhesively securing a non-elastic sheet (not shown) directly to the exposed face of the contracted rubber sheet 10 in the plied construction of Fig. 4, to thereby prevent the plied material 10 and 12 from stretching.

In the foregoing description of the present invention it has been assumed that it is desired to impart the embossed properties of the rubber sheet accurately to the non-elastic sheet. It may, however, in some cases be desirable to impart the embossed properties of the rubber sheet only partially to the non-elastic sheet. In this case the rubber sheet may be stretched in only one direction while the other sheet is being secured thereto, or the rubber sheet at this time may be stretched only sufficiently to partially flatten out the embossed projections. Also it may be desirable in some cases not to apply the adhesive to all parts of the rubber sheet, but instead to spot on the adhesive so that added crepe or embossed effects will be secured.

Having thus described my invention, what I claim and desire to protect by Letters Patent is:

1. An embossed plied material of substantially uniform thickness throughout, comprising an embossed, vulcanized, rubber sheet of substantially the same thickness throughout and provided with projections at one face and corresponding depressions at its opposite face, said sheet being elastic throughout and adapted yieldingly to retain its embossed pattern, and a non-elastic sheet adhered thereto throughout and having the embossed pattern of the rubber sheet imparted accurately thereto.

2. The method of producing embossed plied material in which an elastic and non-elastic sheet are united, which consists in providing a stretchable rubber sheet of substantially uniform thickness throughout and vulcanized to impart thereto an embossed pattern forming projections at one face and corresponding depressions at its opposite face, stretching this sheet to temporarily flatten out said projections, then adhesively securing a non-elastic sheet to said stretched sheet including its flattened projections, and then permitting the rubber sheet to contract and assume its embossed condition and thereby impart its embossed properties to the non-elastic sheet.

VICTOR H. HURT.